(12) United States Patent
Petrmichl et al.

(10) Patent No.: US 8,071,166 B2
(45) Date of Patent: *Dec. 6, 2011

(54) METHOD OF MAKING HEAT TREATED COATED ARTICLE USING DIAMOND-LIKE CARBON (DLC) COATING AND PROTECTIVE FILM

(75) Inventors: Rudolph Hugo Petrmichl, Ann Arbor, MI (US); Jiangping Wang, Novi, MI (US); Nestor P. Murphy, West Bloomfield, MI (US); Maximo Frati, Ypsilanti, MI (US); Jose Nunez-Regueiro, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 569 days.

This patent is subject to a terminal disclaimer.

(21) Appl. No.: 12/230,551

(22) Filed: Aug. 29, 2008

(65) Prior Publication Data

US 2009/0123654 A1  May 14, 2009

Related U.S. Application Data

(63) Continuation-in-part of application No. 11/798,920, filed on May 17, 2007, and a continuation-in-part of application No. 11/699,080, filed on Jan. 29, 2007, now Pat. No. 7,833,574.

(51) Int. Cl.
| | |
|---|---|
| *C23C 16/26* | (2006.01) |
| *B05D 5/00* | (2006.01) |
| *B05D 3/02* | (2006.01) |
| *B32B 33/00* | (2006.01) |

(52) U.S. Cl. .......... 427/249.7; 427/165; 427/397.7; 427/376.2; 428/699; 428/698; 428/701; 428/702; 428/408

(58) Field of Classification Search .......... None
See application file for complete search history.

(56) References Cited

U.S. PATENT DOCUMENTS 4,715,879 A  12/1987 Schmitte et al.
(Continued)

FOREIGN PATENT DOCUMENTS

WO  WO 2005/021454  3/2005
(Continued)

OTHER PUBLICATIONS

Grill,Diamond-like carbon: state of the art, Diamond and Related Materials, 8, 1999, 428-434.*

(Continued)

*Primary Examiner* — Michael Cleveland
*Assistant Examiner* — Francisco Tschen
(74) *Attorney, Agent, or Firm* — Nixon & Vanderhye P.C.

(57) ABSTRACT

There is provided a method of making a heat treated (HT) coated article to be used in shower door applications, window applications, or any other suitable applications where transparent coated articles are desired. For example, certain embodiments of this invention relate to a method of making a coated article including a step of heat treating a glass substrate coated with at least a layer of or including diamond-like carbon (DLC) and an overlying protective film thereon. In certain example embodiments, the protective film may be of or include both (a) an oxygen blocking or barrier layer, and (b) a release layer. Following and/or during heat treatment (e.g., thermal tempering, or the like) the protective film may be removed. Other embodiments of this invention relate to the pre-HT coated article, or the post-HT coated article.

17 Claims, 8 Drawing Sheets

U.S. PATENT DOCUMENTS

| | | | |
|---|---|---|---|
| 5,073,450 | A | 12/1991 | Nietering |
| 5,135,808 | A | 8/1992 | Kimock et al. |
| 5,470,661 | A | 11/1995 | Bailey et al. |
| 5,599,422 | A | 2/1997 | Adams, Jr. et al. |
| 5,635,245 | A | 6/1997 | Kimock et al. |
| 5,858,477 | A | 1/1999 | Veerasamy et al. |
| 5,888,593 | A | 3/1999 | Petrmichl et al. |
| 5,900,342 | A | 5/1999 | Visser et al. |
| 5,935,702 | A | 8/1999 | Macquart et al. |
| 6,002,208 | A | 12/1999 | Maishev et al. |
| 6,261,693 | B1 | 7/2001 | Veerasamy |
| 6,280,834 | B1 | 8/2001 | Veerasamy et al. |
| 6,284,377 | B1 | 9/2001 | Veerasamy |
| 6,303,225 | B1 | 10/2001 | Veerasamy |
| 6,303,226 | B2 | 10/2001 | Veerasamy |
| 6,312,808 | B1 | 11/2001 | Veerasamy et al. |
| 6,335,086 | B1 | 1/2002 | Veerasamy |
| 6,338,901 | B1 | 1/2002 | Veerasamy |
| 6,376,057 | B1 * | 4/2002 | Akao et al. ................. 428/215 |
| 6,447,891 | B1 | 9/2002 | Veerasamy et al. |
| 6,461,731 | B1 | 10/2002 | Veerasamy et al. |
| 6,531,182 | B2 | 3/2003 | Veerasamy et al. |
| 6,592,992 | B2 | 7/2003 | Veerasamy |
| 6,592,993 | B2 | 7/2003 | Veerasamy |
| 6,682,773 | B2 | 1/2004 | Medwick et al. |
| 6,827,977 | B2 | 12/2004 | Veerasamy |
| 6,921,579 | B2 | 7/2005 | O'Shaughnessy et al. |
| 7,060,322 | B2 * | 6/2006 | Veerasamy ................. 427/154 |
| 7,067,175 | B2 | 6/2006 | Veerasamy |
| 7,101,810 | B2 | 9/2006 | Bond et al. |
| 7,150,849 | B2 | 12/2006 | Veerasamy |
| 7,507,442 | B2 | 3/2009 | Veerasamy |
| 7,622,161 | B2 | 11/2009 | Veerasamy |
| 7,833,574 | B2 | 11/2010 | Murphy et al. |
| 2001/0031365 | A1 * | 10/2001 | Anderson et al. ............. 428/432 |
| 2002/0064662 | A1 | 5/2002 | Lingle et al. |
| 2002/0068167 | A1 * | 6/2002 | Veerasamy ................. 428/341 |
| 2003/0013265 | A1 * | 1/2003 | Yang et al. ................... 438/398 |
| 2003/0118860 | A1 | 6/2003 | O'Shaughnessy et al. |
| 2003/0170464 | A1 * | 9/2003 | Veerasamy ................. 428/426 |
| 2004/0209126 | A1 * | 10/2004 | Ziegler et al. ................. 428/702 |
| 2004/0258890 | A1 | 12/2004 | Miller et al. |
| 2004/0258926 | A1 | 12/2004 | Veerasamy |
| 2005/0008852 | A1 | 1/2005 | Hartig |
| 2005/0048284 | A1 * | 3/2005 | Veerasamy ................. 428/408 |
| 2005/0095430 | A1 | 5/2005 | Veerasamy |
| 2005/0095431 | A1 * | 5/2005 | Veerasamy ................. 428/408 |
| 2005/0191494 | A1 | 9/2005 | Veerasamy |
| 2005/0260419 | A1 * | 11/2005 | Hukari et al. ................. 428/428 |
| 2006/0003545 | A1 | 1/2006 | Veerasamy |
| 2006/0057294 | A1 | 3/2006 | Veerasamy et al. |
| 2006/0166009 | A1 | 7/2006 | Veerasamy |
| 2007/0231553 | A1 | 10/2007 | Hartig et al. |
| 2007/0281168 | A1 | 12/2007 | Varanasi et al. |
| 2008/0020211 | A1 | 1/2008 | Petrmichl et al. |
| 2008/0178632 | A1 * | 7/2008 | Petrmichl et al. .............. 65/60.6 |
| 2008/0182032 | A1 | 7/2008 | Krasnov et al. |
| 2008/0182033 | A1 | 7/2008 | Krasnov et al. |
| 2008/0182123 | A1 | 7/2008 | Murphy et al. |
| 2008/0199702 | A1 * | 8/2008 | Murphy et al. ............... 428/408 |
| 2009/0123654 | A1 | 5/2009 | Petrmichl et al. |
| 2010/0021642 | A1 | 1/2010 | Sol |

FOREIGN PATENT DOCUMENTS

| | | |
|---|---|---|
| WO | WO 2007/112229 | 10/2007 |

OTHER PUBLICATIONS

U.S. Appl. No. 11/699,080, filed Jan. 29, 2007; Murphy et al.

U.S. Appl. No. 11/798,920, filed May 17, 2007.

U.S. Appl. No. 11/806,674, filed Jun. 1, 2007; Krasnov et al.

U.S. Appl. No. 11/806,678, filed Jun. 1, 2007; Krasnov et al.

U.S. Appl. No. 11/984,542, filed Nov. 19, 2007, Murphy et al.

U.S. Appl. No. 12/219,770, filed Jul. 28, 2008; Sol.

"Hybrid AC EL Structures with Thin Protective ZnO Film", Tsvetkova et al., Journal of Physics: Conference Series 113 (2008) pp. 1-4.

"Feasibility Study of RF Sputtered ZnO Film for Surface Micromachining", Bhatt et al., Surface & Coatings Technology, 198 (2005) pp. 304-308.

"Low-Emissivity Coating of Amorphous Diamond-Like Carbon/Ag-Alloy Multilayer on Glass" Chiba et al., Applied Surface Science 246 (2005) pp. 48-51.

U.S. Appl. No. 11/798,920, filed May 17, 2007; Petrmichl.

* cited by examiner

METHOD OF MAKING HEAT TREATED COATED ARTICLE USING DIAMOND-LIKE CARBON (DLC) COATING AND PROTECTIVE FILM

This application is a continuation-in-part (CIP) of U.S. Ser. Nos. 11/699,080 filed Jan. 29, 2007 (now U.S. Pat. No 7,833,574), and Ser. No. 11/798,920 filed May 17, 2007, the entire disclosures of which are hereby incorporated herein by reference.

Certain embodiments of this invention relate to a method of making a heat treated (HT) coated article to be used in shower door applications, window applications, tabletop applications, or any other suitable applications. For example, certain embodiments of this invention relate to a method of making a coated article including a step of heat treating a glass substrate coated with at least a layer comprising diamond-like carbon (DLC) and an overlying protective film thereon. In certain example embodiments, the protective film may be of or include both (a) an oxygen blocking or barrier layer, and (b) a release layer. Following and/or during heat treatment (e.g., thermal tempering, or the like) the protective film may be entirely or partially removed. Other embodiments of this invention relate to the pre-HT coated article, or the post-HT coated article.

BACKGROUND OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos.: 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC as a protective overcoat cannot withstand heat treatments (HT) at the extremely high temperatures described above which are often required in the manufacture of vehicle windows, IG window units, glass table tops, and/or the like.

Accordingly, those skilled in the art will appreciate that a need in the art exists for a method of providing heat treated (HT) coated articles with a protective coating (one or more layers) comprising DLC. A need for corresponding coated articles, both heat treated and pre-HT, also exists.

BRIEF SUMMARY OF EXAMPLES OF INVENTION

Certain example embodiments of this invention relate to a method of making a heat treated (HT) coated article to be used in shower door applications, window applications, tabletop applications, or any other suitable application. For example, certain embodiments of this invention relate to a method of making a coated article including a step of heat treating a glass substrate coated with at least a layer comprising diamond-like carbon (DLC) and an overlying protective film thereon. In certain example embodiments, the protective film may be of or include both (a) an oxygen blocking or barrier layer, and (b) a release layer. Following and/or during heat treatment (e.g., thermal tempering, or the like) the protective film may be entirely or partially removed. Other embodiments of this invention relate to the pre-HT coated article, or the post-HT coated article.

An example advantage of using distinct and different oxygen-blocking and release layers in the protective film is that each layer of the protective film can be optimized for its intended function. Consequently, the optimized performance of the protective film may be improved and it can be made thinner if desired.

In certain example embodiments of this invention, there is provided a method of making a heat treated coated article, the method comprising: providing a glass substrate; forming at least one layer comprising diamond-like carbon (DLC) on the glass substrate; forming a protective film on the glass substrate over at least the layer comprising DLC, the protective film include a release layer and an oxygen barrier layer, the release layer and the oxygen barrier layer being of different material and/or different stoichiometry relative to each other; heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

In certain example embodiments of this invention, there is provided a method of making a heat treated coated article, the method comprising: heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes a release layer and an oxygen barrier layer and the release layer and the oxygen barrier layer are of different material and/or different stoichiometry relative to each other; during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

DETAILED DESCRIPTION OF EXAMPLE EMBODIMENTS OF THE INVENTION

Figure 1:
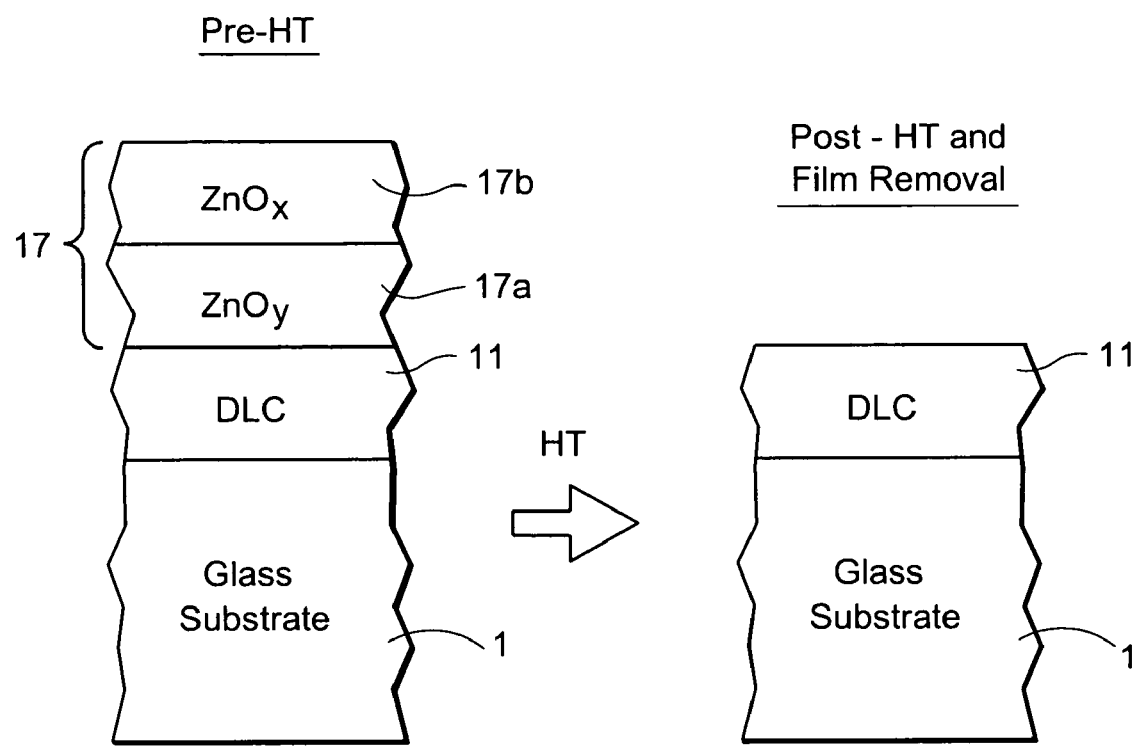
FIG. 1 is a schematic cross sectional view of a coated article, prior to and following heat treatment, according to an example embodiment of this invention.

Referring now more particularly to the accompanying drawings in which like reference numerals indicate like parts throughout the several views.

Certain example embodiments of this invention relate to methods of making coated articles that may use heat treatment (HT), wherein the coated article includes a coating (one or more layers) including diamond-like carbon (DLC). In certain instances, the HT may involve heating a supporting glass substrate, with the DLC thereon, to temperature(s) of from 550 to 800 degrees C., more preferably from 580 to 800 degrees C. (which is well above the burn-off temperature of DLC). In particular, certain example embodiments of this invention relate to a technique for allowing the DLC to withstand such HT without significantly burning off during the same. In certain embodiments, a sacrificial protective film is formed on the glass substrate over the DLC so as to reduce the likelihood of the DLC burning off during HT. Thus, the majority (if not all) of the DLC remains on the glass substrate, and does not burn off, during the HT. Following HT, the sacrificial protective film (which may include one or more layers) may or may not be removed in different embodiments of this invention.

In certain example embodiments, the sacrificial protective film may be of or include both (a) an oxygen blocking or barrier layer, and (b) a release layer. An example advantage of using distinct and different oxygen-blocking and release layers in film 17 is that each layer (17a and 17b) can be optimized for its intended function. Consequently, the optimized performance of the sacrificial film 17 may be improved and it can be made thinner if desired. In certain example embodiments, following HT the DLC inclusive layer protects against abrasion and corrosion, and against adhesion of minerals in hard water (e.g., has good hard water cleanability).

FIG. 1 is a schematic cross sectional view of a coated article, before and after heat treatment, according to an example embodiment of this invention. Typically, the coated article on the left side of FIG. 1 exists during a stage of manufacture prior to heat treatment (HT), but may also exist post-HT in certain instances. The coated article shown in FIG. 1 includes glass substrate 1, DLC inclusive layer 11, and sacrificial protective film 17 which may include one or more layers. In certain example embodiments, the protective film 17 includes first and second layers 17a and 17b which may be of the same or different material(s).

Glass substrate 1 is typically of or includes soda-lime-silica glass, although other types of glass may be used in certain instances.

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more sp carbon-carbon (C—C) bonds than $sp^2$ carbon-carbon (C—C) bonds. In certain example embodiments, at least about 30% or 50% of the carbon-carbon bonds in DLC layer 11 may be sp carbon-carbon (C—C) bonds, more preferably at least about 60% of the carbon-carbon bonds in the layer 11 may be $sp^3$ carbon-carbon (C—C) bonds, and most preferably at least about 70% of the carbon-carbon bonds in the layer 11 may be $sp^3$ carbon-carbon (C—C) bonds. In certain example embodiments of this invention, the DLC may have an average density of at least about 2.4 gm/cm$^3$, more preferably at least about 2.7 gm/cm$^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., $C_2H_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus.

DLC layer 11 allows the coated article to be more scratch resistant than if the DLC II were not provided. It is noted that while layer 11 is on glass substrate 1 in certain embodiments of this invention, additional layer(s) may or may not be under layer 11 between the substrate 1 and layer 11 in certain example embodiments of this invention. Thus, the phrase "on the substrate" as used herein is not limited to being in direct contact with the substrate as other layer(s) may still be provided therebetween.

For example and without limitation, the layer 11 of or including DLC may be any of the DLC inclusive layers of any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. DLC inclusive layer 11 may be hydrophobic (high contact angle), hydrophilic (low contact angle), or neither, in different embodiments of this invention. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17 is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to provide scratch resistance and/or the like. In certain example embodiments, the protective film 17 includes both an oxygen blocking or barrier layer 17a, and a release layer 17b.

It has surprisingly been found that the use zinc and/or zinc oxide in sacrificial protective film 17 is/are especially beneficial with respect to reducing and/or preventing oxygen diffusion into the DLC during HT. In the FIG. 1 example embodiment of this invention, the protective film 17 includes a first zinc inclusive layer 17a and a second zinc oxide inclusive layer 17b. The first zinc inclusive layer 17a may be metallic, substantially metallic, or substoichiometric zinc oxide in different example embodiments of this invention; whereas the second zinc oxide inclusive layer 17b may be of or including zinc oxide in certain example embodiments of this invention. In certain example embodiments, layer 17a is more metallic than layer 17b. In other words, layer 17b contains more oxygen than does layer 17a. Thus, layer 17a is able to function is as a release layer whereas layer 17b is able to function as an oxygen blocking or barrier layer. An oxygen "blocking" or "barrier" layer means that the layer blocks significant amounts of oxygen from reaching the DLC during HT.

In certain example embodiments of this invention, layer 17a may be of or include $ZnO_y$, and layer 17b may be of or include $ZnO_x$, where x>y (i.e., layer 17b contains more oxygen than layer 17a). Moreover, in certain example embodiments of this invention, y is from about 0 to 0.9, more preferably from about 0.1 to 0.9, even more preferably from about 0.1 to 0.8, and possibly from about 0.1 to 0.7. Meanwhile, in certain example embodiments of this invention, x is greater than y, and x is from about 0.3 to 1.0, more preferably from about 0.3 to 0.99, even more preferably from about 0.5 to 0.95, and possibly from about 0.6 to 0.90. Thus, it will be appreciated that in certain example instances, both layers 17a and 17b may be of or include zinc oxide, and both layers 17a and 17b may be substoichiometric.

Advantageously, it has been found that the use of zinc oxide layer 17a that is more metallic than zinc oxide layer 17b surprisingly permits more efficient and easier removal of the protective film 17 during and/or following heat treatment (HT). In other words, layer 17a is a release layer. The different compositions of zinc oxide inclusive layers 17a and 17b is used to cause different stresses in layers 17a and 17b, which stresses are manipulated so as to allow the film 17 to be more easily removed during and/or following HT. In particular, more metallic zinc oxide based layer 17a may be considered a release layer for allowing the film 17 to be easily removed from the DLC or substrate during and/or after HT due to its reduced or no oxygen content, whereas the less metallic (and more oxided) zinc oxide based layer 17b may be considered an oxygen blocking or barrier layer that reduces or prevents the DLC from burning off and/or oxidizing during HT. Note also that any gettering layer may be considered an oxygen barrier layer in certain example instances. In certain example instances, the more oxidic layer 17b may be considered a blocking/protection layer, for protecting the softer less oxidic gettering/barrier layer 17a during heat treatment and otherwise. Zinc oxide is a highly advantageous material for film 17 because it can be easily removed (e.g., using water and/or vinegar) during and/or following HT in a non-toxic manner.

As noted above, one or both of layers 17a and 17b when of or including zinc and/or zinc oxide may be substoichiometric. This is advantageous for oxygen gettering purposes during HT. If the zinc oxide of the entire film 17 is too oxided (i.e., fully stoichiometric) prior to HT, then oxygen can diffuse through the zinc oxide. However, the substoichiometric nature of layer(s) 17a and/or 17b permits the zinc therein to getter oxygen during HT, so that at least layer 17a (and possibly layer 17b) does not burn off during HT. It is noted that upper zinc oxide based layer 17b may or may not burn off (entirely or partially) during HT in different example embodiments of this invention. It is noted that another example advantage of substoichiometric zinc oxide (compared to fully stoichiometric zinc oxide) is that it can be deposited (e.g., via sputtering or the like) more quickly. One or both of layers 17a, 17b may be sputter-deposited in a substoichiometric form, in any suitable manner; e.g., by varying oxygen gas flow in the sputtering chamber(s). For example, as one non-limiting example, layer 17a may be sputter-deposited using 10 ml/kW (regarding content of oxygen gas flow), whereas layer 17b may be sputter-deposited using 12 ml/kW (with remainder of the gas being Ar or the like) in example instances.

Note that one or both of zinc oxide layers 17a and 17b may be doped with other materials such as Al, N, Zr, Ni, Fe, Cr, Ti, Mg, mixtures thereof, or the like, in certain example embodiments of this invention.

In certain example embodiments of this invention, release layer 17a (e.g., of zinc or substoichiometric zinc oxide) may be deposited (e.g., via sputtering) so as to be from about 50-20,000 Å thick, more preferably from about 50-3,000 Å thick, even more preferably from about 100-1,000 Å thick, with an example thickness being from about 100-300 Å. In certain embodiments, zinc oxide inclusive layer 17b may be deposited (e.g., via sputtering) so as to be from about 200-10,000 Å thick, more preferably from about 500-5,000 Å thick, more preferably from about 1,000-3,000 Å thick, with an example thickness being about 2,000 Å. More metallic layer 17a may be thicker than less metallic layer 17b in certain example embodiments of this invention; layer 17a may be at least twice as thick as layer 17b in certain example instances prior to HT. A preferred thickness of overall sacrificial film 17 in certain example embodiments is less than about 10,000 Å, more preferably less than about 3,000 Å, and most preferably less than about 1,000 Å.

Figure 2:
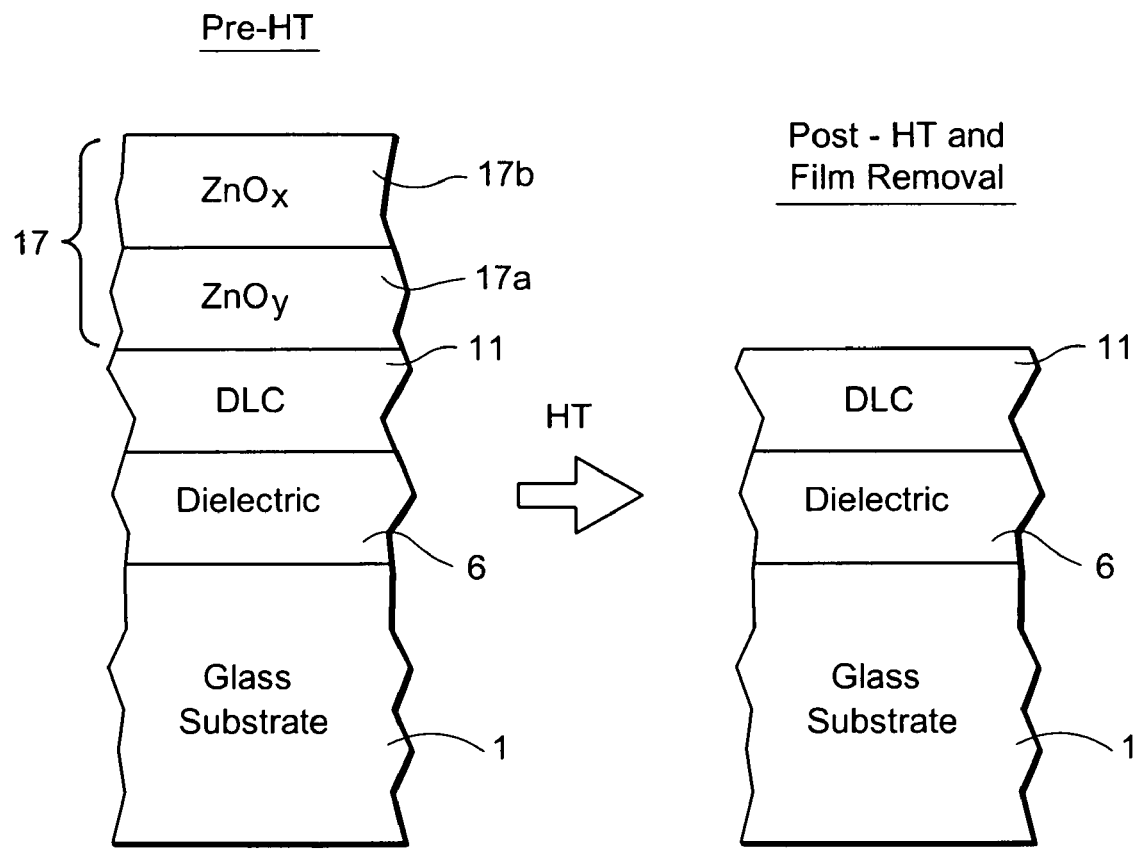
FIG. 2 is a schematic cross sectional view of a coated article, prior to and following heat treatment, according to another example embodiment of this invention.

FIG. 2 illustrates another example embodiment of this invention. The FIG. 2 embodiment is the same as the FIG. 1 embodiment discussed above, except that in the FIG. 2 embodiment a barrier layer 6 is provided between the glass substrate 1 and the DLC inclusive layer 11. Barrier layer 6 may be a dielectric in certain example embodiments of this invention. Optional barrier layer 6 is for preventing or reducing oxygen and/or sodium (Na) from migrating from the glass 1 into the DLC 11 during HT. In this respect, such an optional barrier layer 6 may improve the overall optical characteristics of the coated article post-HT. Barrier layer 6 may be of or include silicon oxide, silicon nitride, silicon oxynitride, and/or the like, although other barrier materials may also be used. Barrier layer(s) 6 is formed on the glass substrate 1 via sputtering, or via any other suitable technique. Barrier layer 6 may be from about 10 to 1,000 Å thick in certain example embodiments, more preferably from 50 to 500 Å thick, and most preferably from 50 to 200 Å thick. It is noted that a barrier layer(s) 6 may also be provided in other example embodiments of this invention, for instance in any of FIGS. 4-7 if desired between the DLC 11 and the glass substrate 1.

Figure 3:
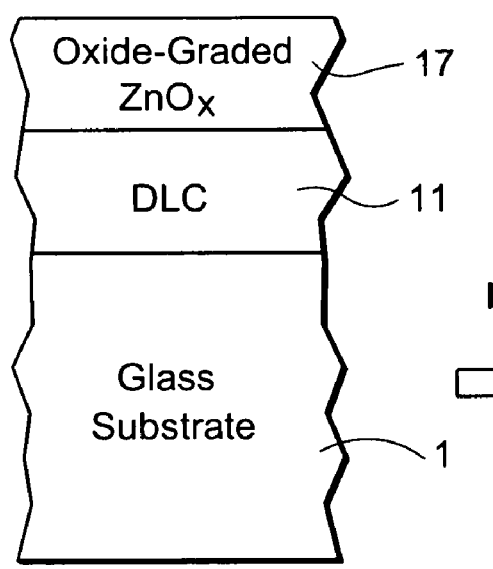
FIG. 3 is a schematic cross sectional view of a coated article, prior to and following heat treatment, according to another example embodiment of this invention.
Figure 3:
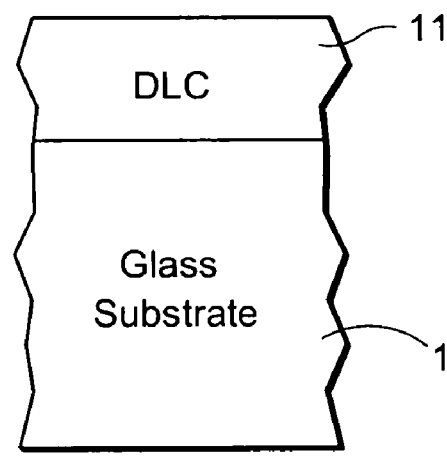

FIG. 3 illustrates another example embodiment of this invention. The FIG. 3 embodiment is the same as the FIG. 1 embodiment (or even the FIG. 2 embodiment if barrier layer 6 is used, which may be the case in the FIG. 3 embodiment), except that instead of two discrete layers 17a and 17b the protective film 17 is made of one layer that is oxidation graded (continuously or non-continuously) through its thickness. In the FIG. 3 embodiment, the film 17 is provided in a manner so that the film 17 includes more oxygen at a location further from the DLC layer 11 than at another location in the film closer to the DLC layer 11. Note that the film 17 in the FIG. 1-2 embodiments may also be considered oxidation graded because the overall film 17 is more oxided in layer 17b further from the DLC 11 than in layer 17a closer to the DLC 11. However, in the FIG. 3 embodiment, it is also possible for continuous or substantially continuous oxidation grading to occur through the entire or substantially entire film 17 in certain example instances.

An example process of manufacturing a coated article will now be described, with reference to FIGS. 1-3. Initially, glass substrate 1 is provided, and at least one barrier layer 6 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 6. At least one layer 11 of or including DLC is deposited (e.g., via ion beam deposition) on the glass substrate 1, over at least the optional barrier layer 6 if present. Then, protective film 17, e.g., including layers 17a and 17b, is deposited on the substrate 1 over the DLC inclusive layer 11. Protective film 17 may be deposited via sputtering, CVD, ion beam deposition, or any other suitable technique. Optionally, a thin protective layer comprising DLC, silicon nitride, aluminum nitride, or silicon aluminum nitride (not shown), may be provided over sacrificial film 17 prior to HT, for durability and/or oxygen barrier purposes.

As shown in FIGS. 1-2, the glass substrate 1 with films 6 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The HT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during HT, the majority if not all of DLC inclusive layer 11 remains on the substrate 1 even after the HT due to the presence of protective film 17.

A significant advantage associated with using zinc and/or zinc oxide in film 17 is its ease of removal after HT. Protective layers such as silicon nitride are sometime undesirable since they require complex etching in order to remove the same after HT. On the other hand, it has been found that when film 17 is made of zinc and/or zinc oxide, soluble in vinegar and/or water (possibly only water with no vinegar required in certain preferred embodiments), the application of vinegar and/or water allows portions of film 17 remaining after HT to be easily removed in a non-toxic manner. Again, in certain example embodiments, it is possible to remove the zinc oxide with only water (no vinegar needed) in certain instances, which is advantageous from a cost and processing point of view. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments).

After film 17 has been removed, the remaining coated article is shown at the right side of FIGS. 1-2, and includes an outer layer comprising scratch resistant DLC. The aforesaid processes are advantageous in that they provide a technique for allowing a coated article including a protective DLC inclusive layer 11 to be heat treated without the DLC layer 11 burning off during such HT. In other words, it becomes possible to provide a protective DLC inclusive layer 11 on a heat treated (e.g., thermally tempered) product in a commercially acceptable manner.

Figure 4:
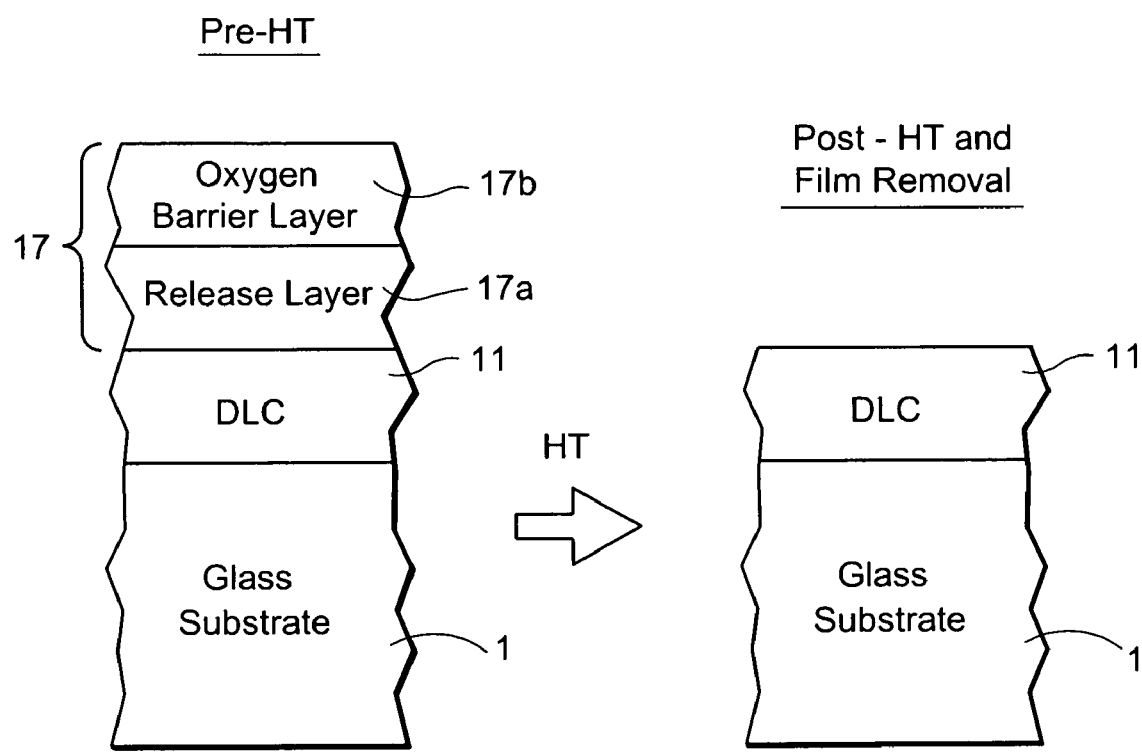
FIG. 4 is a schematic cross sectional view of a coated article, prior to and following heat treatment, according to an example embodiment of this invention.

FIG. 4 is a cross sectional view of an example embodiment of this invention that is similar to FIGS. 1-2, except that release layer 17a and oxygen blocking layer 17b need not be of zinc oxide. A barrier layer 6 (discussed above) may or may not be provided between the glass and the DLC in the FIG. 4 embodiment (although it is not shown in the figure).

The oxygen blocking or barrier layer 17b may be of or include a material selected from the group consisting of: zinc oxide, silicon carbide, aluminum nitride, boron oxide, aluminum oxide, aluminum oxynitride, silicon nitride, silicon oxide, silicon oxynitride, and mixtures thereof. Preferred materials for the oxygen blocking or barrier layer 17b are aluminum nitride and silicon carbide in certain example embodiments. In certain example embodiments, the layer 17b is designed to be about as hard and/or durable as glass.

The release layer 17a may be of any suitable material that dissolves or readily reacts with water, vinegar, or bleach. Release layer 17a preferably has a melting point (or dissociation temperature) above 580 or 600 degrees C. in certain example embodiments. The release layer 17a may be of or include oxides, suboxides, nitrides and/or subnitrides of boron, titanium boride, magnesium, zinc, and mixtures thereof. Preferred materials for the release layer 17a in certain example embodiments are suboxides of zinc, magnesium and/or titanium boride. Note that the term "oxide" as used herein is broad enough to encompass suboxides.

In certain example embodiments, release layer 17a is more dissolvable than is layer 17b in water, vinegar, bleach and/or the like. Moreover, in certain example embodiments, oxygen barrier layer 17b is more of a barrier to oxygen and/or is harder than is release layer 17a. Exemplary coatings may produce high quality post-HT and post-release DLC, with good scratch resistance and good hard water cleanability. The release layer 17a and/or the oxygen barrier layer 17b may be deposited via sputtering, or any other suitable technique, in different example embodiments of this invention.

Figure 5:
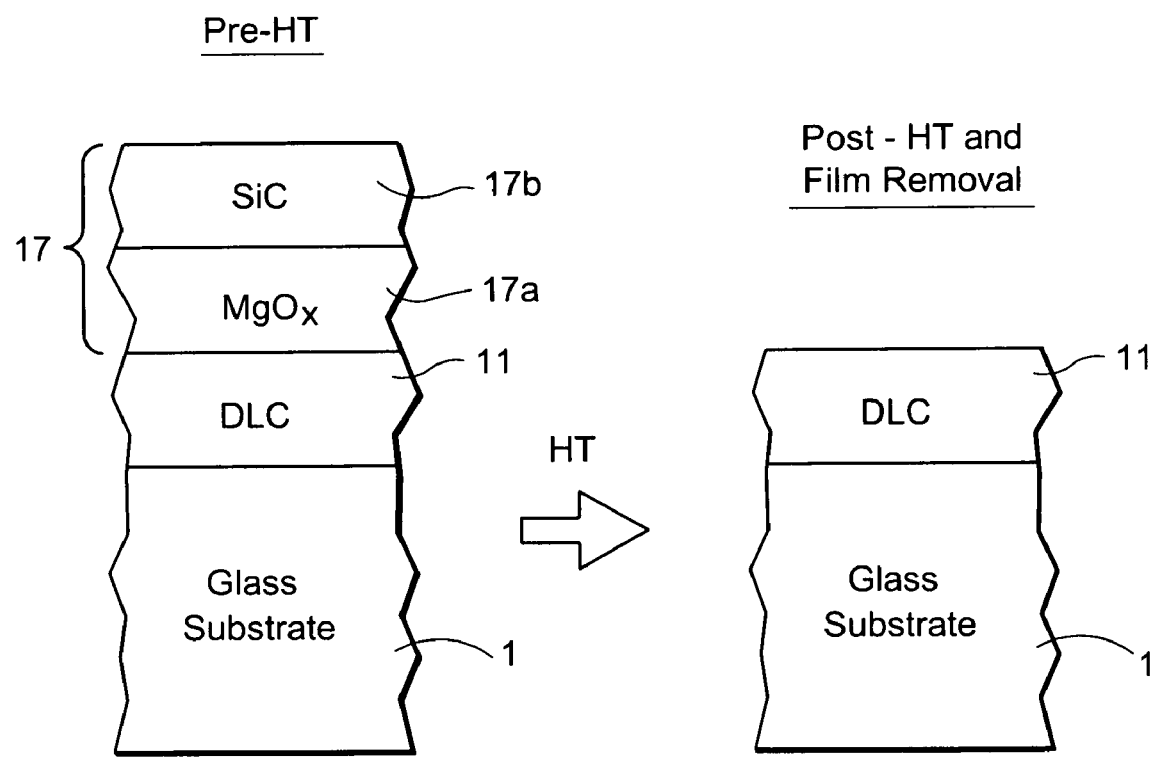
FIG. 5 is a schematic cross sectional view of a coated article, prior to and following heat treatment, according to another example embodiment of this invention.

FIG. 5 shows an example embodiment where the release layer 17a is of or includes a suboxide of magnesium ($MgO_x$), and the oxygen blocking or barrier layer 17b is of or includes silicon carbide. Optionally, a barrier layer 6 may be provided between the DLC 11 and the glass substrate 1 in certain instances of this embodiment, for reducing sodium migration during or due to HT. After heat treatment or HT (e.g., tempering), the product is exposed to a mildly reactive liquid (e.g., water, vinegar, dilute ammonia and/or bleach), and the liquid penetrates through to the release layer 17a via pinholes or grain boundaries in the overlying layer(s) and causes the release layer to disband from the DLC I 1. Thus, the release layer 17a and the oxygen barrier layer 17b are removed following the HT. Hot water is a particularly good release liquid for use with the materials shown in the FIG. 5 embodiment. Example thickness are as follows in this example embodiment: barrier layer 6 of silicon nitride or silicon oxynitride formed by sputtering about 125 or 150 Å thick; DLC layer 11 about 50 Å thick; MgOx layer 17*a* about 190 Å thick, and SiC layer 17*b* about 280 Å thick.

Figure 6:
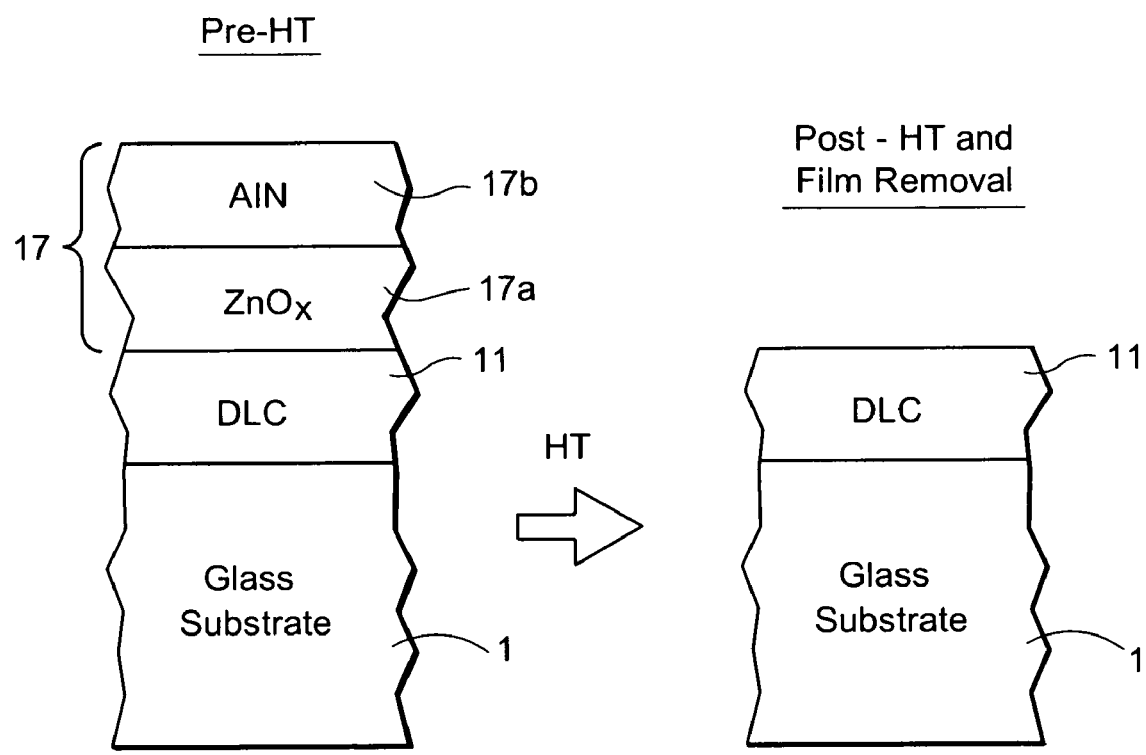
FIG. 6 is a schematic cross sectional view of a coated article, prior to and following heat treatment, according to another example embodiment of this invention.

FIG. 6 shows an example embodiment where the release layer 17*a* is of or includes a suboxide of zinc (ZnO$_x$), and the oxygen blocking or barrier layer 17*b* is of or includes aluminum nitride (AlN). Optionally, a barrier layer 6 may be provided between the DLC 11 and the glass substrate 1 in certain instances of this embodiment, for reducing sodium migration during or due to HT. After heat treatment or HT (e.g., tempering), the product is exposed to a mildly reactive liquid (e.g., water, vinegar, dilute ammonia and/or bleach), and the liquid penetrates through to the release layer 17*a* via pinholes or grain boundaries in the overlying layer(s) and causes the release layer to disband from the DLC 11. Thus, the release layer 17*a* and the oxygen barrier layer 17*b* are removed following the HT. Vinegar is a particularly good release liquid for use with the materials shown in the FIG. 6 embodiment. Example thickness are as follows in this example embodiment: barrier layer 6 of silicon nitride about 150 Å thick; DLC layer 11 about 50 Å thick; ZnOx layer 17*a* about 500 Å thick, and AlN layer 17*b* about 200 Å thick.

Figure 7:
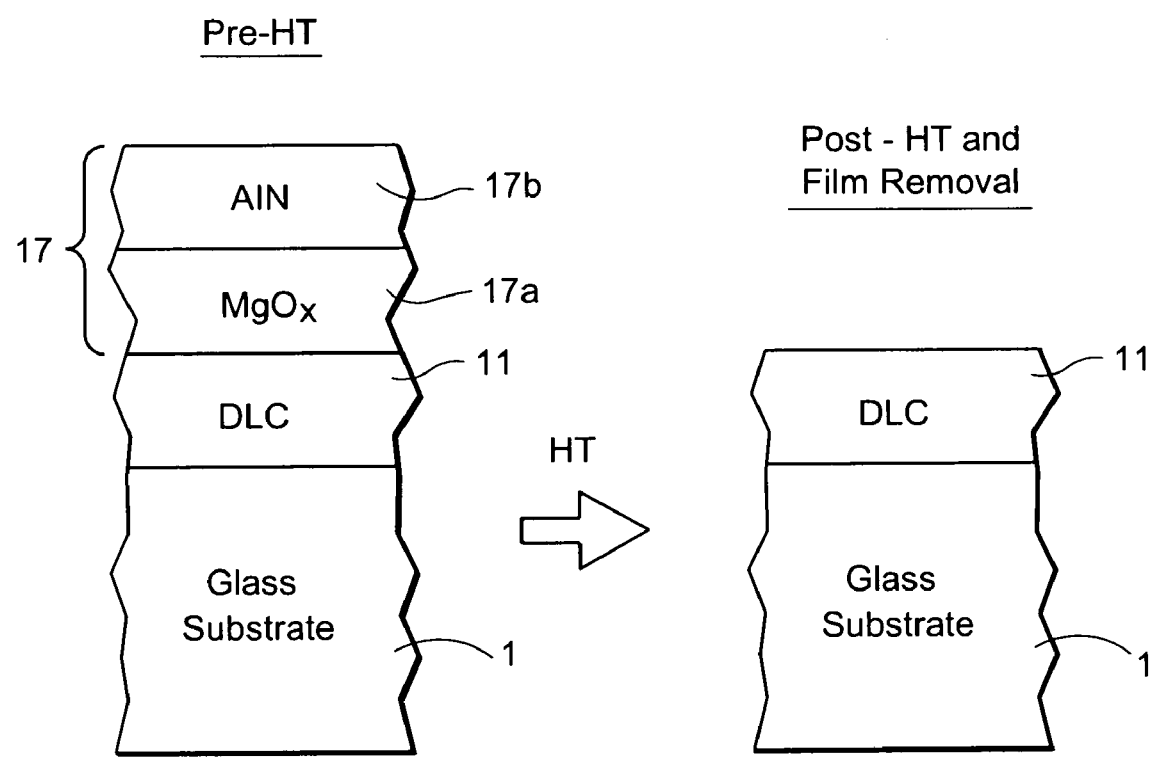
FIG. 7 is a schematic cross sectional view of a coated article, prior to and following heat treatment, according to another example embodiment of this invention.

FIG. 7 shows an example embodiment where the release layer 17*a* is of or includes a suboxide of Mg (MgO$_x$), and the oxygen blocking or barrier layer 17*b* is of or includes aluminum nitride (AlN). Optionally, a barrier layer 6 may be provided between the DLC 11 and the glass substrate 1 in certain instances of this embodiment, for reducing sodium migration during or due to HT. After heat treatment or HT (e.g., tempering), the product is exposed to a mildly reactive liquid (e.g., water, vinegar, dilute ammonia and/or bleach), and the liquid penetrates through to the release layer 17*a* via pinholes or grain boundaries in the overlying layer(s) and causes the release layer to disband from the DLC 11. Thus, the release layer 17*a* and the oxygen barrier layer 17*b* are removed following the HT. Hot water is a particularly good release liquid for use with the materials shown in the FIG. 7 embodiment. Example thickness are as follows in this example embodiment: DLC layer 11 about 50 Å thick; MgOx layer 17*a* about 230 Å thick, and AlN layer 17*b* about 200 Å thick.

Figure 8:
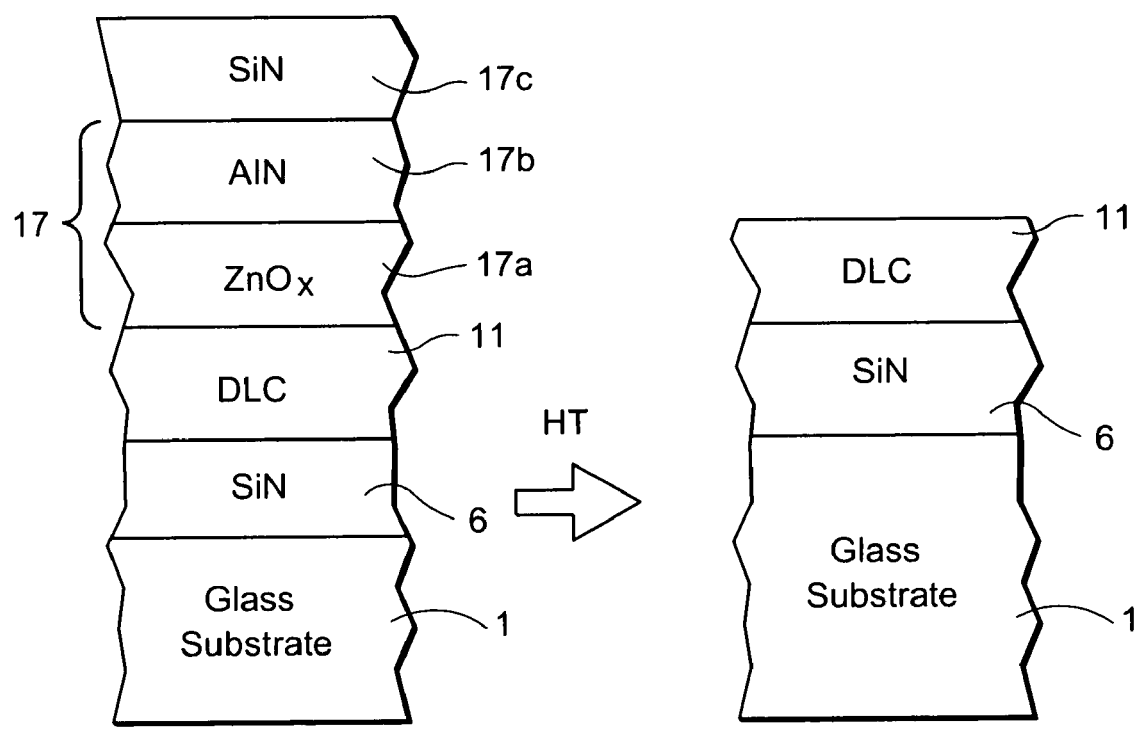
FIG. 8 is a schematic cross sectional view of a coated article, prior to and following heat treatment, according to another example embodiment of this invention.

FIG. 8 is applicable to any of the embodiments discussed above as well. FIG. 8 shows an example embodiment where the release layer 17*a* is of or includes a suboxide of zinc (ZnO$_x$), the oxygen blocking or barrier layer 17*b* is of or includes aluminum nitride (AlN), and a top coat protective layer 17*c* of or including silicon nitride and/or silicon oxynitride is provided. Optionally, a barrier layer 6 (e.g., of or including silicon nitride, silicon oxide, and/or silicon oxynitride) may be provided between the DLC 11 and the glass substrate 1 in certain instances of this embodiment, for reducing sodium migration during or due to HT. After heat treatment or HT (e.g., tempering), the product is exposed to a mildly reactive liquid (e.g., water, vinegar, dilute ammonia and/or bleach), and the liquid penetrates through to the release layer 17*a* via pinholes or grain boundaries in the overlying layer(s) and causes the release layer to disband from the DLC 11. Thus, the release layer 17*a*, the oxygen barrier layer 17*b*, and the protective layer 17*c* are removed following the HT. Vinegar is a particularly good release liquid for use with the materials shown in the FIG. 8 embodiment, although other liquid(s) such as water may also or instead be used for removal of sacrificial film 17. Brushing (e.g., via rotating brushes such as nylon brushes or the like) may be used to remove film 17 when wetted with water or the like in certain example instances. Example thickness are as follows in this example embodiment: barrier layer 6 of silicon nitride from about 100-300 Å thick (e.g., about 200 Å thick); DLC layer 11 from about 30-60 Å thick (e.g., about 30-50 Å thick); ZnOx layer 17*a* from about 500-2,000 Å thick, oxygen blocking AlN layer 17*b* from about 100-300 Å thick (e.g., about 200 Å thick), and protective silicon nitride inclusive layer 17*c* from about 0-500 Å thick (e.g., about 200-300 Å thick). The silicon nitride based protective layer 17*c* is advantageous in that it provides improved mechanical durability of the sacrificial film 17, and prevents or reduces damage to the coated article of film during transport and handling (e.g., if the film 17 is scratched, it may not adequately protect the DLC during HT from burning off).

According to certain example embodiments of this invention, coated articles herein lose no more than about 15% of their visible transmission due to HT, more preferably no more than about 10%. Moreover, monolithic coated articles herein preferably have a visible transmission after HT of at least about 50%, more preferably of at least about 60 or 75%.

In any of the embodiments discussed above (e.g., see FIGS. 1-7), it is also possible to provide an optional scratch resistant layer (e.g., of or including SiC or DLC—not shown) over the layer 17*b*.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
    heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes a release layer comprising substoichiometric zinc oxide and an oxygen barrier layer comprising aluminum nitride;
    during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and
    exposing the protective film to a release liquid and removing at least part of the protective film during and/or after said heat treating.

2. The method of claim 1, wherein the protective film further comprises a layer comprising silicon nitride located over at least the oxygen barrier layer.

3. The method of claim 1, wherein the protective film further comprises a dielectric layer located over the oxygen barrier layer at least prior to the heat treating.

4. The method of claim 3, wherein the dielectric layer comprises silicon nitride.

5. The method of claim 1, wherein the coated glass substrate further comprises a layer comprising silicon nitride located between the glass substrate and the layer comprising DLC.

6. The method of claim 1, wherein the heat treating comprises heating the glass substrate with the layer comprising DLC and the protective film thereon using at least temperature(s) of at least 550 degrees C.

7. The method of claim 1, wherein the heat treating comprises heating the glass substrate with the layer comprising DLC and the protective film thereon using at least temperature(s) of at least 580 degrees C.

8. The method of claim 1, wherein the layer comprising DLC comprises amorphous DLC and has more $sp^3$ carbon-carbon bonds than $sp^2$ carbon-carbon bonds.

9. The method of claim 1, wherein the layer comprising DLC has an average hardness of at least 20 GPa.

10. The method of claim 1, wherein the layer comprising DLC has a density of at least about 2.7 gm/cm$^3$, and wherein the layer comprising DLC is hydrogenated.

11. The method of claim 1, wherein the layer comprising DLC is hydrogenated.

12. The method of claim 1, wherein the coated article is substantially transparent and is used as a shower door following heat treating and removal of the protective film.

13. The method of claim 1, wherein after said removing step at least part of the layer comprising DLC is exposed so as to be an outermost layer of the coated article.

14. The method of claim 1, wherein the release layer comprising substoichiometric zinc oxide comprises $ZnO_y$, where y is from about 0.1 to 0.9.

15. The method of claim 1, wherein the release layer comprising substoichiometric zinc oxide comprises $ZnO_y$, where y is from about 0.1 to 0.8.

16. The method of claim 1, wherein the release layer comprising substoichiometric zinc oxide comprises $ZnO_y$, where y is from about 0.1 to 0.7.

17. The method of claim 1, wherein the release layer comprising substoichiometric zinc oxide is directly under and contacting the oxygen barrier layer comprising aluminum nitride.

* * * * *